US012789395B2

(12) United States Patent
Henskes et al.

(10) Patent No.: US 12,789,395 B2
(45) Date of Patent: Nov. 10, 2026

(54) FLANGE CONNECTION AND ROBOT ARM

(71) Applicant: Neura Robotics GmbH, Metzingen (DE)

(72) Inventors: Michael Henskes, Moenchengladbach (DE); Jannik Goez, Albstadt (DE); Joern Malzahn, Metzingen (DE)

(73) Assignee: Neura Robotics GmbH, Metzingen (DE)

( * ) Notice: Subject to any disclaimer, the term of this patent is extended or adjusted under 35 U.S.C. 154(b) by 0 days.

(21) Appl. No.: 19/197,197

(22) Filed: May 2, 2025

(65) Prior Publication Data

US 2025/0339976 A1 Nov. 6, 2025

(30) Foreign Application Priority Data

May 3, 2024 (DE) ......................... 102024112446.6

(51) Int. Cl.
*B25J 15/04* (2006.01)

(52) U.S. Cl.
CPC ................................. *B25J 15/0408* (2013.01)

(58) Field of Classification Search
CPC ......... B25J 18/00; B25J 17/00; B25J 15/0408
USPC ..... 74/490.05; 285/364, 365, 368, 406, 407, 285/410
See application file for complete search history.

(56) References Cited

U.S. PATENT DOCUMENTS 4,990,022 A 2/1991 Watanabe et al.
5,443,581 A * 8/1995 Malone .................. F16L 23/16 285/364
6,416,246 B1 7/2002 Boeck
6,439,619 B1 * 8/2002 Storage .................. F16L 23/04 285/365
7,399,005 B2 * 7/2008 Rigollet .................. F16L 23/08 285/410

(Continued)

FOREIGN PATENT DOCUMENTS

CN 112549069 A1 3/2021
CN 113910199 A 1/2022

(Continued)

OTHER PUBLICATIONS

European search report issued Jul. 7, 2025, in corresponding pending application EP 25169659.7.

(Continued)

*Primary Examiner* — T. Scott Fix
(74) *Attorney, Agent, or Firm* — Nath, Goldberg & Meyer; Jerald L. Meyer; Stanley N. Protigal

(57) ABSTRACT

A clamping ram has a shaft with a longitudinal axis, a first end and a second end. At the second end, two arms are arranged which extend in the longitudinal direction and are mutually spaced by a gap. Each of the arms has an inner surface and an outer surface. At a free end of the arms, a radial thickening is provided on each outer surface. Between the two arms, a wedge plate is arranged so as to be movable in the longitudinal direction. In a retracted position of the wedge plate, the arms are in a compressed state and, in an advanced position of the wedge plate, the arms are in a spread state. Each of the two radial thickenings has a contact surface which, in the spread state, are each part of an imaginary surface that is rotationally symmetrical about the longitudinal axis.

15 Claims, 7 Drawing Sheets

(56) References Cited

U.S. PATENT DOCUMENTS

| | | | | |
|---|---|---|---|---|
| 7,559,265 | B2 | 7/2009 | Mizuno | |
| 9,505,136 | B1 * | 11/2016 | Nusser | B25J 9/08 |
| 11,548,171 | B2 * | 1/2023 | Lee | B25J 15/045 |
| 11,971,073 | B2 * | 4/2024 | Blank | F16D 43/202 |
| 2019/0070726 | A1 | 3/2019 | Bilsky | |
| 2020/0391393 | A1 | 12/2020 | Johansen | |

FOREIGN PATENT DOCUMENTS

| | | | |
|---|---|---|---|
| DE | 102022134703 | B3 | 5/2024 |
| EP | 0627975 | B1 | 12/1994 |

OTHER PUBLICATIONS

German examination report of Jan. 9, 2025, from the priority application DE 10 2024 112 446.6.

* cited by examiner

FLANGE CONNECTION AND ROBOT ARM

FIELD

The invention relates to a flange connection for connecting a first robot arm part to a second robot arm part and relates to a robot arm having such a flange connection.

BACKGROUND

Especially robots intended for handling tasks in the broadest sense usually have at least one robot arm for performing the intended task. Such a robot arm usually comprises a plurality of robot arm parts that are connected to each other by means of flange connections during assembly of the robot. These flange connections transfer the static and dynamic forces and moments acting in the robot arm between the robot arm parts. In existing robot arms, screw flanges are sometimes used for this purpose, by means of which the robot arm parts are connected to one another by means of a plurality of screw connections arranged parallel to the robot arm longitudinal axis.

In order to keep the moments acting on the robot arm as small as possible, the aim is to make the flange connections as short as possible in relation to a robot arm longitudinal axis. Therefore, in the known systems, only very limited installation space is available axially adjacent to the flange connections, which leads to poor installability and adjustability of the screw connections.

SUMMARY

It is the object of the invention to provide an axially compact flange connection for a robot arm that is easy to install and adjust. It is further an object of the invention to provide a robot arm whose robot arm parts may be put together easily and securely.

The objects are achieved according to the invention by a flange connection for connecting a first robot arm part to a second robot arm part comprises a flange longitudinal axis, a first flange element, a second flange element and at least one clamping body. The first flange element comprises a flange shoulder and a first flange projection which projects in a direction of the flange longitudinal axis and has at least one first clamping extension. The flange longitudinal axis is preferably formed parallel to or coincident with a robot arm longitudinal axis of the first robot arm part and/or the second robot arm part. The first flange element may be formed in one piece. The second flange element comprises at least one second flange projection which projects in a direction of the flange longitudinal axis and has a second clamping extension. Preferably, the second flange projection projects from the second flange element in the opposite direction to the first flange projection.

According to the invention, the first flange element and the second flange element are arranged relative to one another such that, with respect to the flange longitudinal axis, the second clamping extension is arranged between the flange shoulder and the at least one first clamping extension, and that by inserting the at least one clamping body between the at least one first clamping extension and the second clamping extension, a frictional and/or form-fitting connection of the second clamping extension to the flange shoulder may be established. With respect to the flange longitudinal axis, the at least one clamping body is thus preferably arranged between the at least one first clamping extension and the second clamping extension. Relative to the flange longitudinal axis, the flange connection can therefore be designed with a small installation space requirement. Also, by providing the at least one insertable clamping body, the assembly work when connecting the first flange element to the second flange element may also be decoupled from the direction specified by the flange longitudinal axis. In addition, providing at least one clamping body offers a simple adjustment option for the flange connection, in particular based on a clamping force. Preferably, the at least one clamping body is arranged so as to be insertable perpendicular to the flange longitudinal axis.

Preferably, the at least one clamping body is wedge-shaped. As a result, the flange connection may be determined by selecting an insertion depth of the at least one clamping body between the at least one first clamping extension and the second clamping extension. Due to the wedge-shaped design, the at least one clamping body preferably has a trapezoidal cross-section.

Preferably, the at least one first clamping extension has a first clamping surface for interacting with the at least one clamping body and the second clamping extension has a second clamping surface for interacting with the at least one clamping body, wherein the first clamping surface and/or the second clamping surface form a clamping angle between 0° and 90°, particularly preferably between 10° and 30°, with an insertion axis arranged in an insertion direction of the at least one clamping body. In particular, if the at least one clamping body is wedge-shaped, clamping surfaces of the clamping body that abut the first clamping surface or the second clamping surface are preferably formed parallel to the respective corresponding clamping surfaces.

The at least one first clamping extension may be in the form of a flexible tongue. This may improve the adjustability of the flange connection.

Preferably, the second clamping extension has a shoulder contact surface arranged parallel to the flange shoulder for establishing the frictional and/or form-fitting connection to the flange shoulder. The shoulder contact surface is preferably different from the second clamping surface. Particularly preferably, the shoulder contact surface is arranged opposite the second clamping surface. The shoulder contact surface is preferably arranged perpendicular to the flange longitudinal axis. If the second clamping surface has the clamping angle described above, the second clamping extension may have a trapezoidal cross-section.

In a development of the invention, the flange connection has a friction plate which is arranged between the flange shoulder and the second clamping extension. The friction plate is preferably used to improve the frictional engagement when the connection of the second clamping extension to the flange shoulder is purely frictional. Particularly preferably, the friction plate is arranged between the flange shoulder and the shoulder contact surface.

In a preferred embodiment of the invention, the flange connection comprises at least one clamping screw by means of which the at least one clamping body can be inserted between the at least one first clamping extension and the second clamping extension. This allows the clamping force to be adjusted by means of the tightening torque of the at least one clamping screw. Preferably, the at least one clamping body can be inserted by screwing in the at least one clamping screw. The at least one clamping screw may be arranged in at least one through hole in the at least one clamping body.

The first flange projection or the second flange projection may have at least one threaded bore into which the at least one clamping screw can be screwed. Preferably, the at least one threaded bore is provided in the first flange projection. The first flange projection may have at least one screw base, which preferably projects counter to an insertion direction and particularly preferably adjoins the at least one first clamping extension in the direction of the flange longitudinal axis.

In a preferred embodiment of the invention, the at least one clamping body has two mutually opposite end portions and a middle portion arranged between the end portions, wherein the at least one clamping body is arranged such that either: one of the at least one first clamping extension is arranged at each of the two end portions and one of the at least one second flange projection is arranged at the middle portion, or one of the at least one second flange projection is arranged at each of the two end portions and one of the at least one first clamping extension is arranged at the middle portion. In this way, a secure force transmission between the first flange element and the second flange element can be achieved. Preferably, the at least one second flange projection is arranged in each case with the second clamping extension at the at least one clamping body.

Preferably, the at least one first clamping extension and the at least one second flange projection are arranged alternately in a circumferential direction around the flange longitudinal axis. As a result, each of the at least one second flange projection can be adjacent to the at least one first clamping extension in the circumferential direction and, if present, to the at least one screw base.

Preferably, the number of the at least one clamping body corresponds to the number of the at least one first clamping extension and/or the number of the at least one second flange projection. This allows the adjustability of the flange connection to be further improved and tolerances to be better compensated.

In a development of the invention, the first flange element has a plurality of first clamping extensions and the second flange element has a plurality of second flange projections. In this way, a uniform force transmission between the first flange element and the second flange element can be achieved. Preferably, twelve first clamping projections and twelve second flange projections are present. Preferably, each of the first clamping extensions has the features of the previously described at least one first clamping extension and each of the second flange projections has the features of the previously described at least one second flange projection.

Particularly preferably, the first clamping extensions and the second flange projections are evenly distributed around the flange longitudinal axis. The first flange element and the second flange element may thus be crown-shaped.

A robot arm according to the invention comprises a first robot arm part, a second robot arm part and a flange connection as described above, wherein the first flange element is fixedly arranged on the first robot arm part and the second flange element is fixedly arranged, i.e., preferably rotationally and translationally immovable, on the second robot arm part. When assembling the robot arm, the first flange element can be arranged on the first robot arm part and the second flange element on the second robot arm part before the connection of the two robot arm parts is established by joining together the first flange element and the second flange element. This allows a robot arm to be provided that can be easily and securely assembled.

BRIEF DESCRIPTION OF THE DRAWINGS

An exemplary embodiment of the invention is explained using the following figures. In the drawings:

FIGS. 1 to 5 show different views of an exemplary embodiment. For the sake of clarity, not all reference numbers are used in every figure. The same reference numbers are used for identical and functionally identical parts.

DETAILED DESCRIPTION

Figure 1:
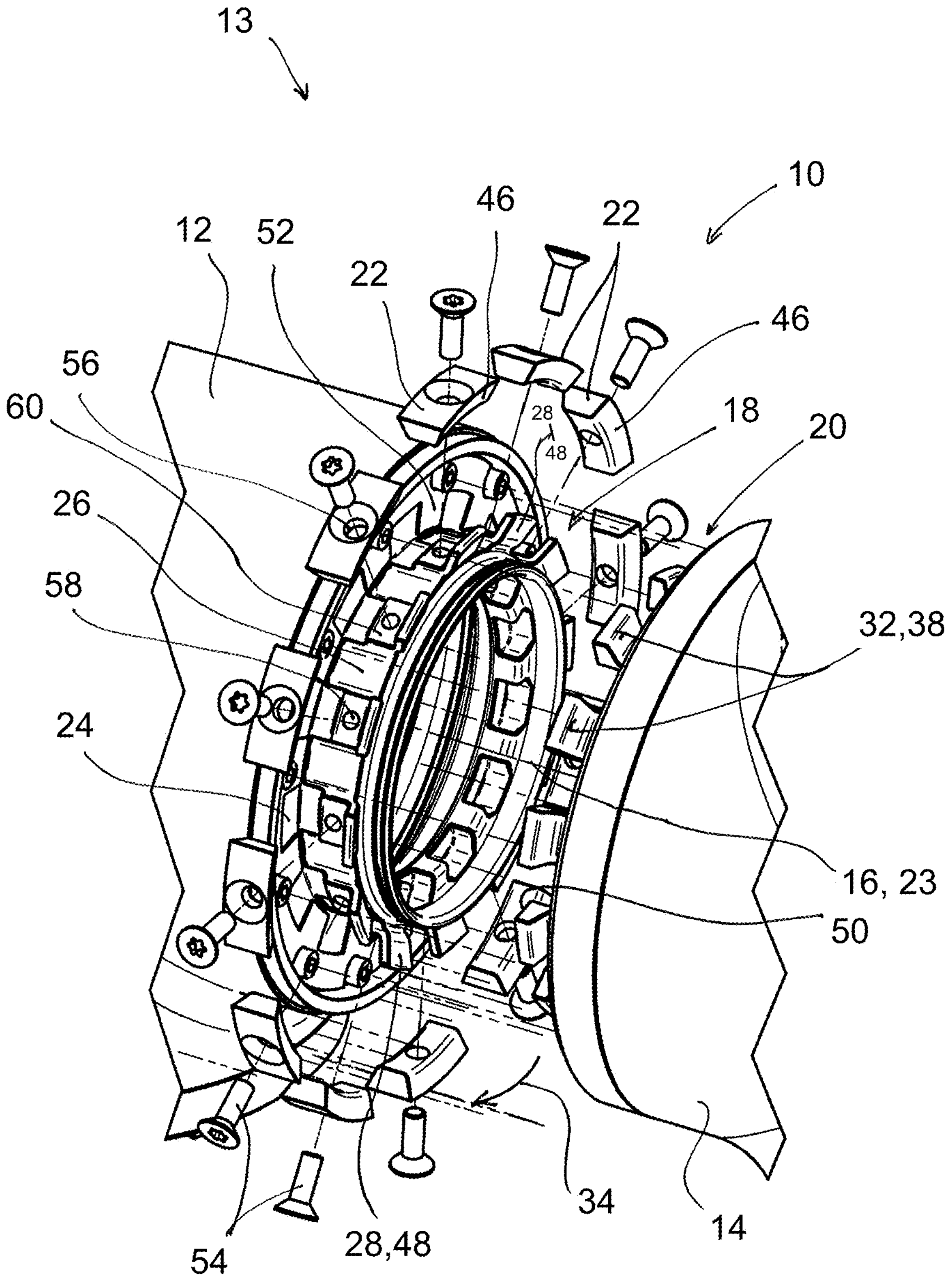
FIG. 1 is a schematic exploded view of an exemplary embodiment of a flange connection in an installation situation.

FIG. 1 shows an exploded view of an exemplary embodiment of a flange connection 10 for connecting a first robot arm part 12 of a robot arm 13 to a second robot arm part 14 of the robot arm 13. FIG. 1 shows the flange connection 10 in an installation situation, so that the first robot arm part 12 and the second robot arm part 14 are also shown.

The flange connection 10 comprises a flange longitudinal axis 16, a first flange element 18 and a second flange element 20 and may have a plurality of clamping bodies 22. The flange longitudinal axis 16 may be formed to coincide with a robot arm longitudinal axis 23 of the first robot arm part 12 and of the second robot arm part 14.

Preferably, the first flange element 18 is fixedly arranged on the first robot arm part 12 and the second flange element 20 is fixedly arranged on the second robot arm part 14. In this way, when assembling the robot arm 13, the first flange element 18 can be arranged on the first robot arm part 12 and the second flange element 20 on the second robot arm part 14 before the connection of the two robot arm parts 12, 14 is established by joining together the first flange element 18 and the second flange element 20.

As FIG. 1 further shows, the first flange element 18 comprises a flange shoulder 24 and a first flange projection 26 which projects in a direction of the flange longitudinal axis 16 and may have a plurality of first clamping extensions 28. The second flange element 20 preferably comprises a plurality of second flange projections 30, each having a second clamping extension 32. Preferably, the second flange projections 30 project from the second flange element 20 in a direction opposite to the first flange projection 26 along the flange longitudinal axis 16.

Figure 1A:
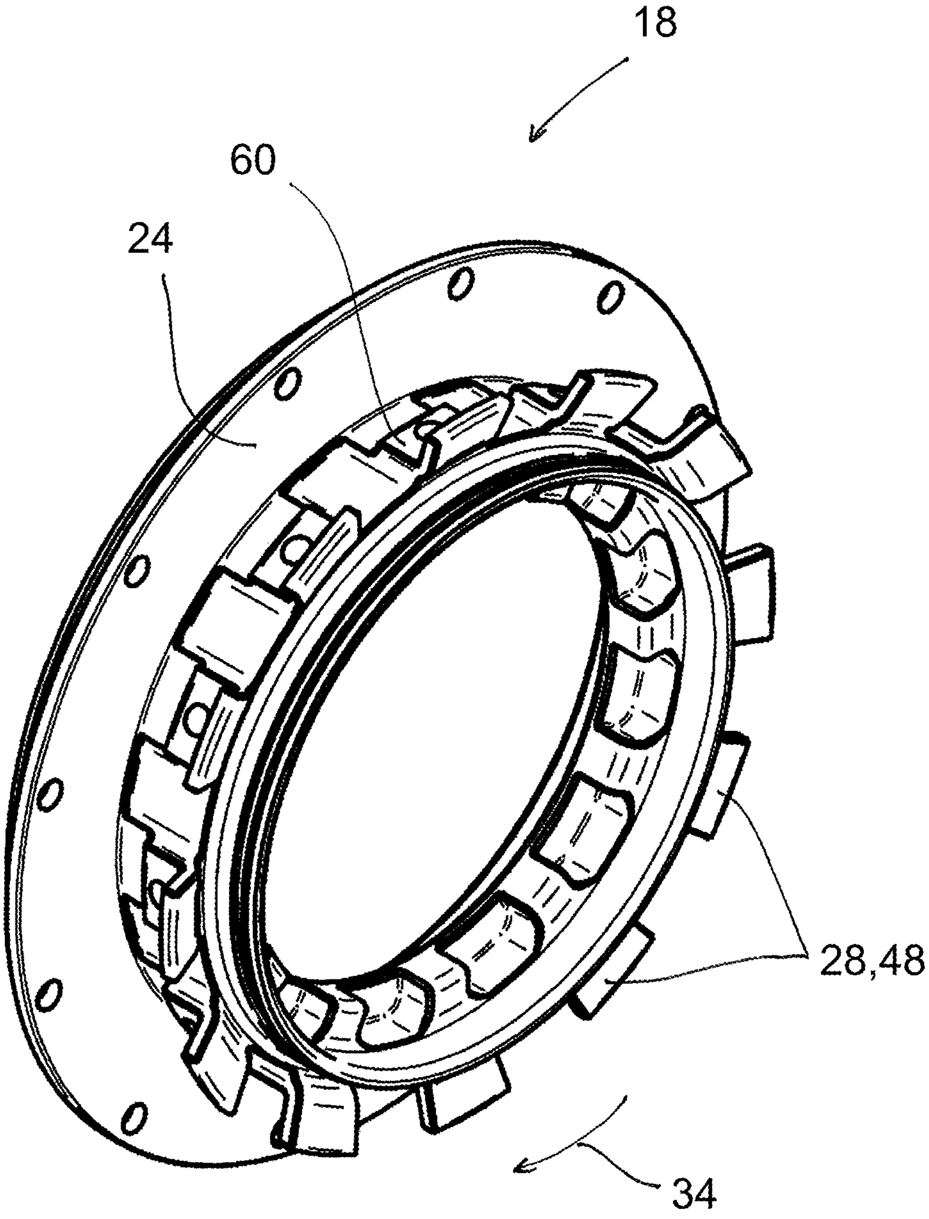
FIG. 1*a* is a schematic perspective view of a first flange element of the exemplary embodiment shown in FIG. 1.
Figure 1B:
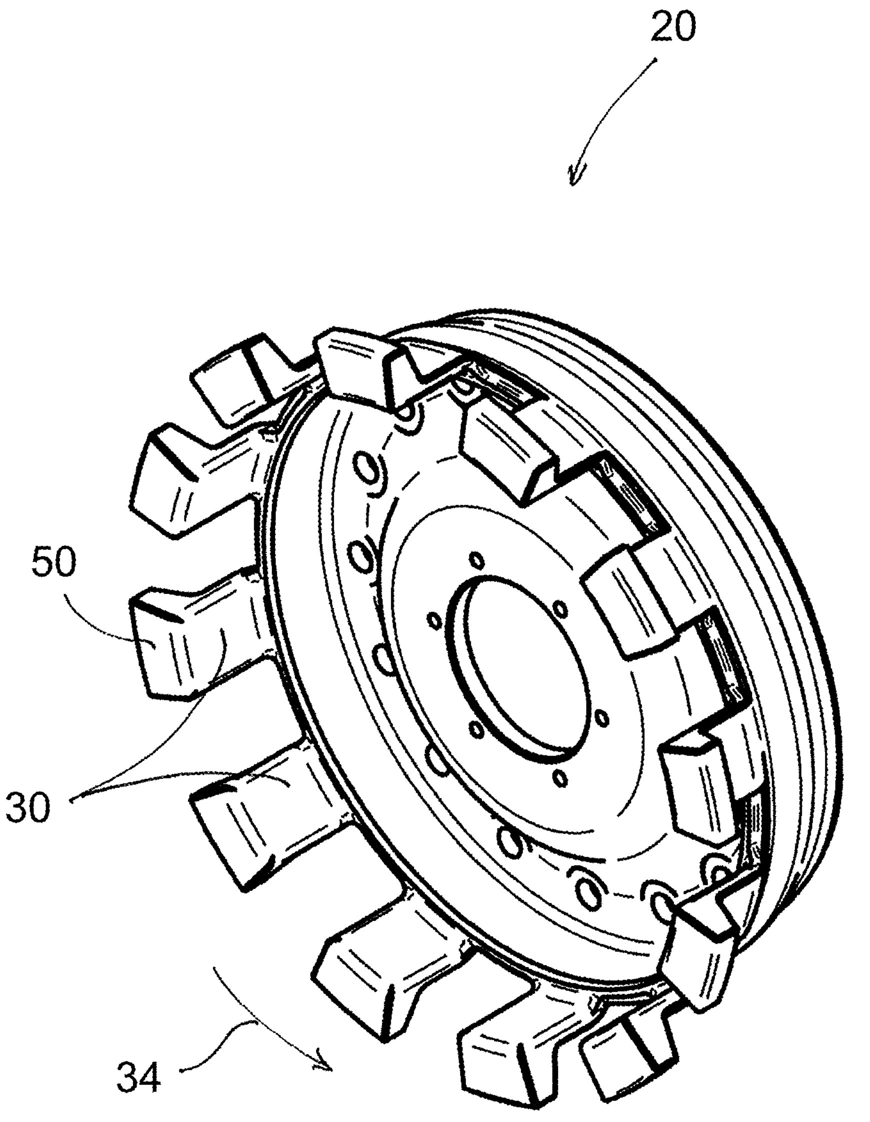
FIG. 1*b* is a schematic perspective view of a second flange element of the exemplary embodiment shown in FIG. 1.

According to the illustration in FIG. 1, the first clamping extensions 28 and the second flange projections 30 are preferably arranged uniformly and alternately in a circumferential direction 34 around the flange longitudinal axis 16, resulting in a crown shape of the first flange element 18 and the second flange element 20 (see FIGS. 1*a* and 1*b*). Thus, every second flange projection 30 can be adjacent to one of the first clamping extensions 28 in the circumferential direction 34. Preferably, twelve first clamping extensions 28, twelve second flange projections 30 and twelve clamping bodies 22 are present.

Figure 2:
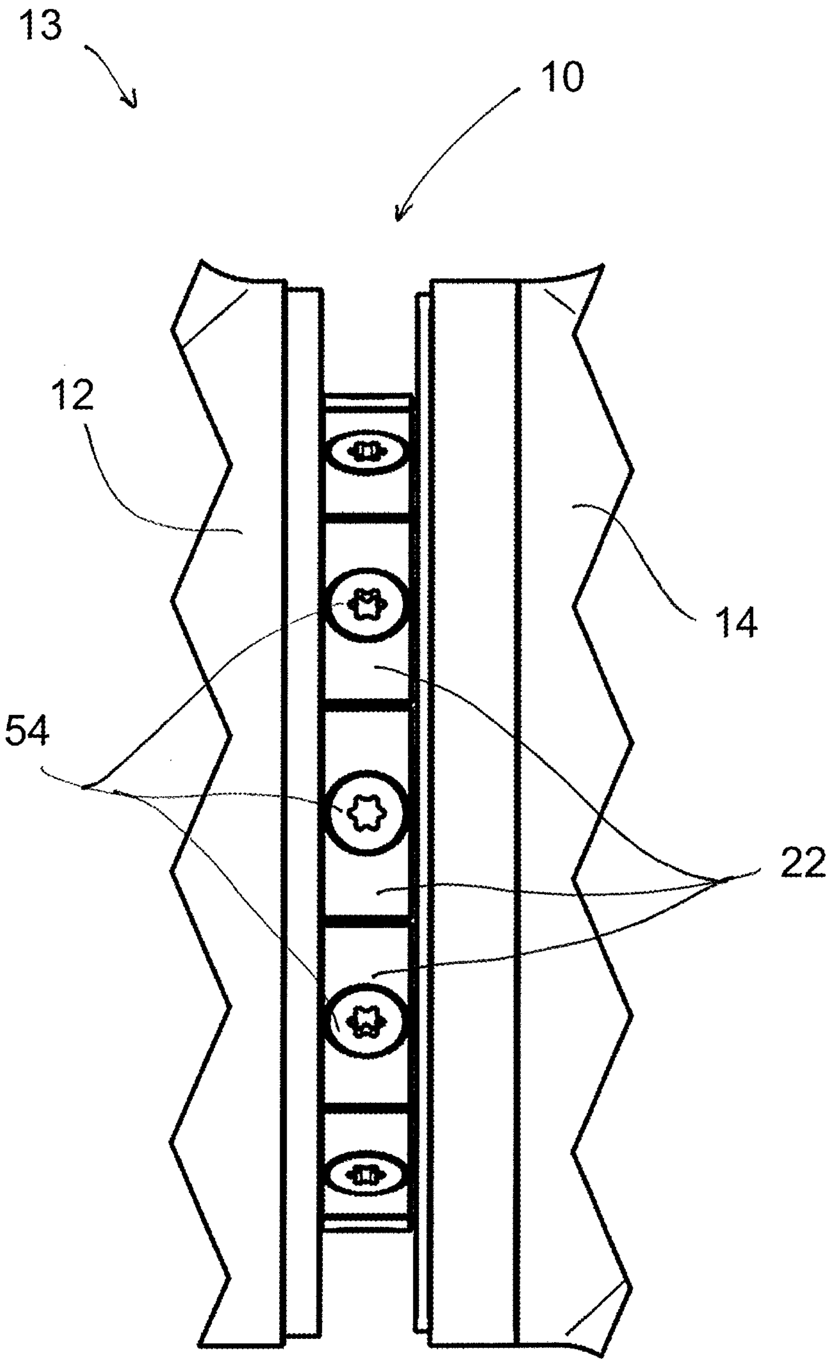
FIG. 2 is a schematic side view of the installation situation shown in FIG. 1.

FIG. 2 shows a side view of the arrangement shown in FIG. 1. This figure makes clear that the flange connection 10 has a very small axial installation space requirement along the flange longitudinal axis 16.

Figure 3:
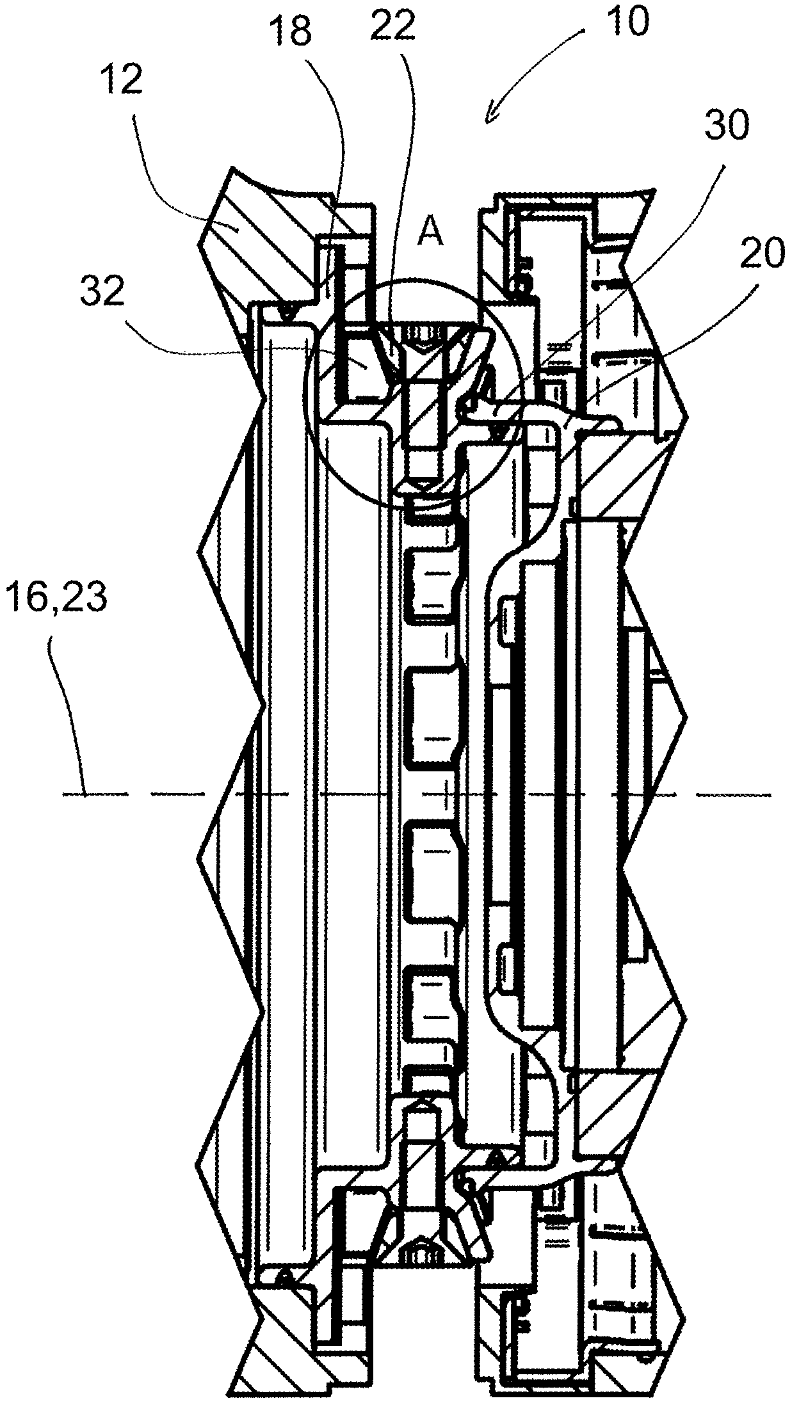
FIG. 3 is a schematic sectional view of the installation situation shown in FIG. 1 with marked detail A.

FIG. 3 shows a longitudinal section through the arrangement shown in FIG. 2 along the flange longitudinal axis 16. The detail A is highlighted, which is shown enlarged in FIG. 4 and which further explains the functioning of the flange connection 10.

Figure 4:
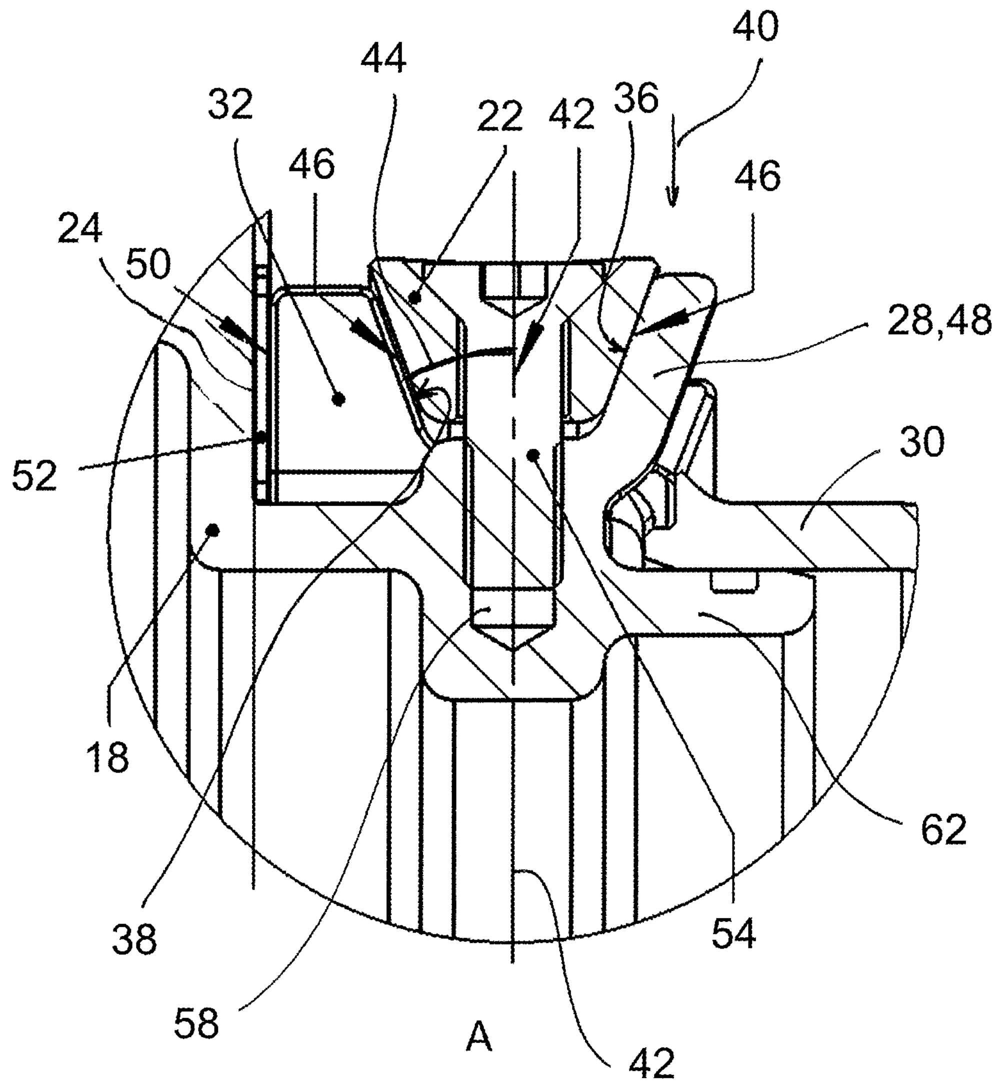
FIG. 4 is an enlarged schematic representation of the detail A marked in FIG. 3.

The combination of FIGS. 3 and 4 shows that the first flange element 18 and the second flange element 20 are arranged relative to one another such that, with respect to the flange longitudinal axis 16, the second clamping extension 32 located behind the cutting plane is arranged between the flange shoulder 24 and the first clamping extension 28 located in the cutting plane. By inserting one of the clamping bodies 22 between the first clamping extension 28 and the second clamping extension 32, a frictional connection of the second clamping extension 32 to the flange shoulder 24 can be established. Preferably, the clamping body 22 is arranged so as to be insertable perpendicular to the flange longitudinal axis 16.

FIG. 4 clearly shows that the clamping bodies 22 are wedge-shaped and have a trapezoidal cross-section. As a result, the flange connection 10 can be determined via the insertion depth of the clamping bodies 22 between the respective first clamping extension 28 and the respective second clamping extensions 32.

Each of the first clamping extensions 28 may have a first clamping surface 36 for interacting with one of the clamping bodies 22 and each of the second clamping extensions 32 may have a second clamping surface 38 for interacting with one of the clamping bodies 22. The first clamping surface 36 and the second clamping surface 38 preferably form a clamping angle 44 between 10° and 30° with an insertion axis 42 arranged in an insertion direction 40 of the clamping body 22 shown in FIG. 4. In particular, if the clamping bodies 22 are wedge-shaped, clamping surfaces 46 of the clamping bodies 22 that abut the first clamping surface 36 or the second clamping surface 38 are preferably formed parallel to the respective corresponding clamping surfaces 36, 38. As shown, in particular, in FIG. 4 but also in FIG. 1, the first clamping extensions 28 are preferably in the form of flexible tongues 48.

As can also be seen from FIGS. 1 and 4, each of the second clamping extensions 32 has a shoulder contact surface 50 arranged parallel to the flange shoulder 24 for establishing the frictional connection to the flange shoulder 24. Preferably, the shoulder contact surface 50 is arranged opposite the second clamping surface 38. The shoulder contact surface 50 is preferably arranged perpendicular to the flange longitudinal axis 16, so that the second clamping extensions 32 may each have a trapezoidal cross-section.

The flange connection 10 may have a friction plate 52, which can be seen, in particular, in FIGS. 1 and 4. The friction plate 52 is preferably arranged between the flange shoulder 24 and the second clamping extensions 32, where it can serve to improve the frictional engagement. Particularly preferably, the friction plate is arranged between the flange shoulder 24 and the respective shoulder contact surface 50.

Each clamping body 22 can preferably be inserted between the respective first clamping extension 28 and the respective second clamping extensions 32 by means of a clamping screw 54 in each case. This allows the clamping force to be adjusted by means of the tightening torques of the clamping screw 54. The clamping bodies 22 may have through holes 56 in which the clamping screws 54 are preferably arranged.

As shown in FIG. 4, the first flange projection 26 may have, for each of the clamping bodies 22, a threaded bore 58 into which the respective clamping screw 54 can be screwed. The first flange projection 26 may have a screw base 60 adjoining each of the first clamping extensions 28, preferably projecting counter to the insertion direction 40.

FIG. 4 further shows that the first flange element 18 may be formed in one piece. The first flange element 18 may have a sealing projection 62 which can interact with the second flange element 20 to seal the flange connection 10 with respect to the environment.

Figure 5:
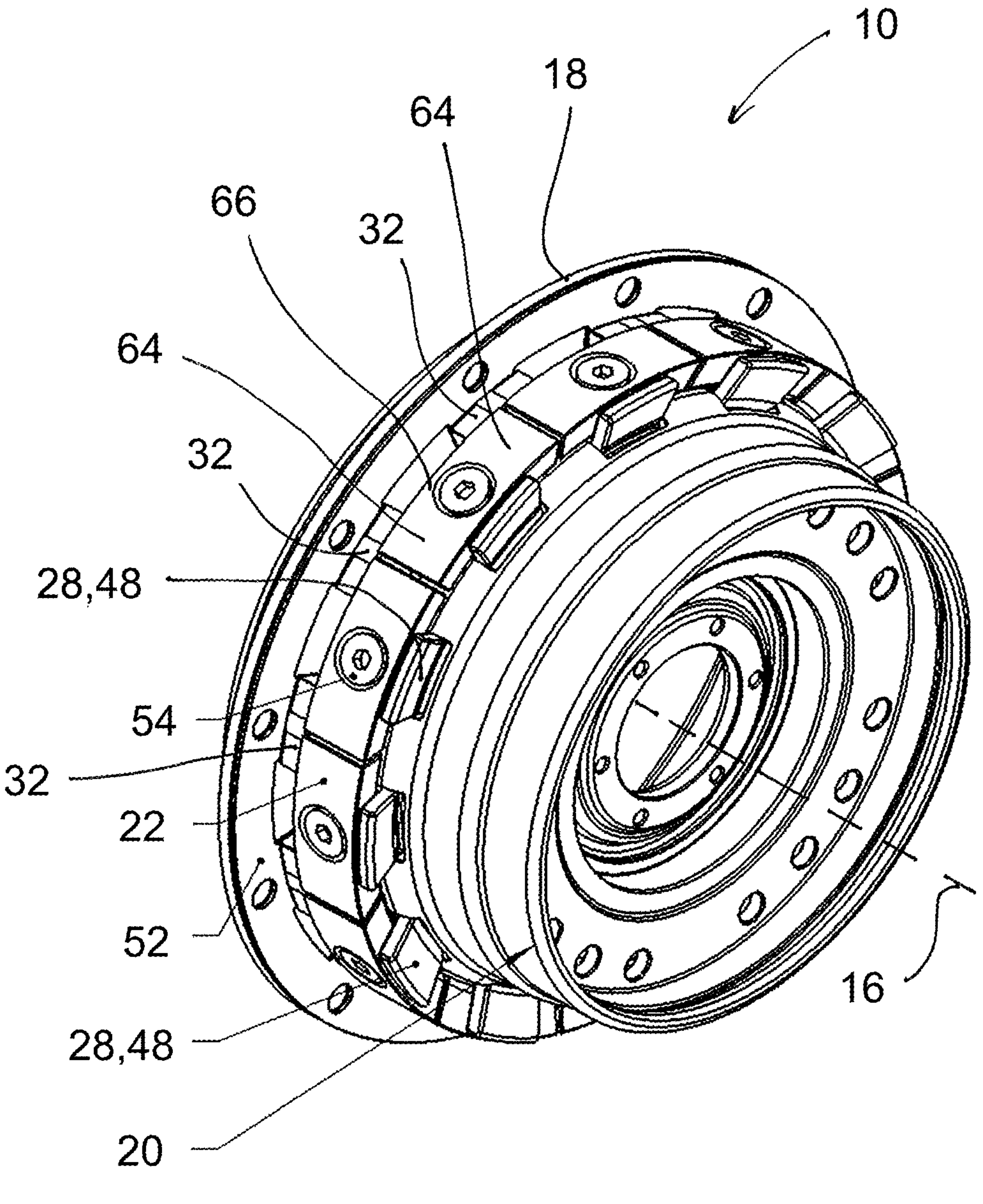
FIG. 5 is a perspective schematic representation of the exemplary embodiment shown in FIG. 1 in isolation.

FIG. 5 shows a representation of the flange connection 10 in isolation, i.e., without connected robot arm parts 12, 14. This view shows that each of the clamping bodies 22 may have two mutually opposite end portions 64 and a middle portion 66 arranged between the end portions 64. Preferably, each of the clamping bodies 22 is arranged such that one of the second flange projections 30 is arranged at each of the two end portions 64 of the clamping body 22 and one of the first clamping extensions 28 is arranged at the middle portion 66 of the clamping body 22. Preferably, the second flange projections 30 are each arranged with the respective second clamping extension 32 at the respective clamping body 22.

LIST OF REFERENCE SIGNS

10 Flange connection
12 First robot arm part
13 Robot arm
14 Second robot arm part
16 Flange longitudinal axis
18 First flange element
20 Second flange element
22 Clamping body
23 Robot arm longitudinal axis
24 Flange shoulder
26 First flange projection
28 First clamping extension
30 Second flange projection
32 Second clamping extension
34 Circumferential direction
36 First clamping surface
38 Second clamping surface
40 Insertion direction
42 Insertion axis
44 Clamping angle
46 Clamping surface
48 Flexible tongue
50 Shoulder contact surface
52 Friction plate
54 Clamping screw
56 Through hole
58 Threaded bore
60 Screw base
62 Sealing projection
64 End portion
66 Middle portion

The invention claimed is:

1. A flange connection (10) for connecting a first robot arm part (12) to a second robot arm part (14), having a flange longitudinal axis (16), a first flange element (18), a second flange element (20) and at least one clamping body (22), wherein the first flange element (18) comprises a flange shoulder (24), and a first flange projection (26) which projects in a direction of the flange longitudinal axis (16) and has at least one first clamping extension (28), wherein the second flange element (20) comprises at least one second flange projection (30) which projects in a direction of the flange longitudinal axis (16) and has a second clamping extension (32), and wherein the first flange element (18) and the second flange element (20) are arranged relative to one another such that, with respect to the flange longitudinal axis (16), the second clamping extension (32) is arranged between the flange shoulder (24) and the at least one first clamping extension (28), and that by inserting the at least one clamping body (22) between the at least one first clamping extension (28) and the second clamping extension (32), a frictional and/or form-fitting connection of the second clamping extension (32) to the flange shoulder (24) can be established.

2. The flange connection according to claim 1, characterized in that the at least one clamping body (22) is wedge-shaped.

3. The flange connection according to claim 1, characterized in that the at least one first clamping extension (28) has a first clamping surface (36) for interacting with the at least one clamping body (22) and the second clamping extension (32) has a second clamping surface (38) for interacting with the at least one clamping body (22), wherein the first clamping surface (36) and/or the second clamping surface (38) form a clamping angle (44) between 0° and 90°, with an insertion axis (42) arranged in an insertion direction (40) of the at least one clamping body (22).

4. The flange connection according to claim 1, characterized in that the at least one first clamping extension (28) is in the form of a flexible tongue (48).

5. The flange connection according to claim 1, characterized in that the second clamping extension (32) has a shoulder contact surface (50) arranged parallel to the flange shoulder (24) for establishing the frictional and/or form-fitting connection to the flange shoulder (24).

6. The flange connection according to claim 1, characterized in that the flange connection (10) has a friction plate (52) which is arranged between the flange shoulder (24) and the second clamping extension (32).

7. The flange connection according to claim 1, characterized in that the flange connection (10) comprises at least one clamping screw (54) by means of which the at least one clamping body (22) can be inserted between the at least one first clamping extension (28) and the second clamping extension (32).

8. The flange connection according to claim 7, characterized in that the first flange projection (26) or the second flange projection (30) has at least one threaded bore (58) into which the at least one clamping screw (54) can be screwed.

9. The flange connection according to claim 1, characterized in that the at least one clamping body (22) has two mutually opposite end portions (64) and a middle portion (66) arranged between the end portions (64), wherein the at least one clamping body (22) is arranged such that either: one of the at least one first clamping extension (28) is arranged at each of the two end portions (64) and one of the at least one second flange projection (30) is arranged at the middle portion (66), or one of the at least one second flange projection (30) is arranged at each of the two end portions (64) and one of the at least one first clamping extension (28) is arranged at the middle portion (66).

10. The flange connection according to claim 1, characterized in that the at least one first clamping extension (28) and the at least one second flange projection (30) are arranged alternately and/or offset from one another in a circumferential direction (34) around the flange longitudinal axis (16).

11. The flange connection according to claim 1, characterized in that the number of the at least one clamping body (22) corresponds to the number of the at least one first clamping extension (28) and/or the number of the at least one second flange projection (30).

12. The flange connection according to claim 1, characterized in that the first flange element (18) has a plurality of first clamping extensions (28) and the second flange element (20) has a plurality of second flange projections (30).

13. The flange connection according to claim 12, characterized in that the first clamping extensions (28) and the second flange projections (30) are evenly distributed around the flange longitudinal axis (16).

14. A robot arm (13) having a first robot arm part (12), a second robot arm part (14) and a flange connection (10) according to claim 1, wherein the first flange element (18) is fixedly arranged on the first robot arm part (12) and the second flange element (20) is fixedly arranged on the second robot arm part (14).

15. The flange connection according to claim 1, characterized in that the at least one first clamping extension (28) has a first clamping surface (36) for interacting with the at least one clamping body (22) and the second clamping extension (32) has a second clamping surface (38) for interacting with the at least one clamping body (22), wherein the first clamping surface (36) and/or the second clamping surface (38) form a clamping angle (44) between 10° and 30°, with an insertion axis (42) arranged in an insertion direction (40) of the at least one clamping body (22).

* * * * *